(12) United States Patent
Johnson

(10) Patent No.: US 12,528,005 B2
(45) Date of Patent: Jan. 20, 2026

(54) WEATHER-BASED PROJECTILE RANGE PREDICTION AND CLUB SELECTOR TOOL

(71) Applicant: EDH US LLC, Orlando, FL (US)

(72) Inventor: Henri Johnson, Windermere, FL (US)

(73) Assignee: EDH US LLC, Orlando, FL (US)

( * ) Notice: Subject to any disclaimer, the term of this patent is extended or adjusted under 35 U.S.C. 154(b) by 0 days.

(21) Appl. No.: 18/740,808

(22) Filed: Jun. 12, 2024

(65) Prior Publication Data

US 2024/0416207 A1 Dec. 19, 2024

Related U.S. Application Data

(60) Provisional application No. 63/508,821, filed on Jun. 16, 2023.

(51) Int. Cl.
*A63B 69/36* (2006.01)
*A63B 24/00* (2006.01)
*A63B 71/06* (2006.01)

(52) U.S. Cl.
CPC ...... *A63B 69/3605* (2020.08); *A63B 24/0021* (2013.01); *A63B 24/0062* (2013.01); *A63B 69/3658* (2013.01); *A63B 71/0622* (2013.01); *A63B 2024/0034* (2013.01); *A63B 2024/0056* (2013.01); *A63B 2220/20* (2013.01); *A63B 2220/70* (2013.01); *A63B 2220/89* (2013.01)

(58) Field of Classification Search
None
See application file for complete search history.

(56) References Cited

U.S. PATENT DOCUMENTS

| | | | |
|---|---|---|---|
| 2003/0163278 A1* | 8/2003 | Clark | A63B 71/0622 702/138 |
| 2010/0331120 A1* | 12/2010 | Galindo | A63B 57/00 473/409 |
| 2022/0118341 A1* | 4/2022 | Tanaka | G06V 10/14 |

* cited by examiner

*Primary Examiner* — Jason T Yen
(74) *Attorney, Agent, or Firm* — Schwegman Lundberg & Woessner, P.A.

(57) ABSTRACT

Systems, methods, and computer-readable media are provided for making a weather-based club recommendation.

18 Claims, 7 Drawing Sheets

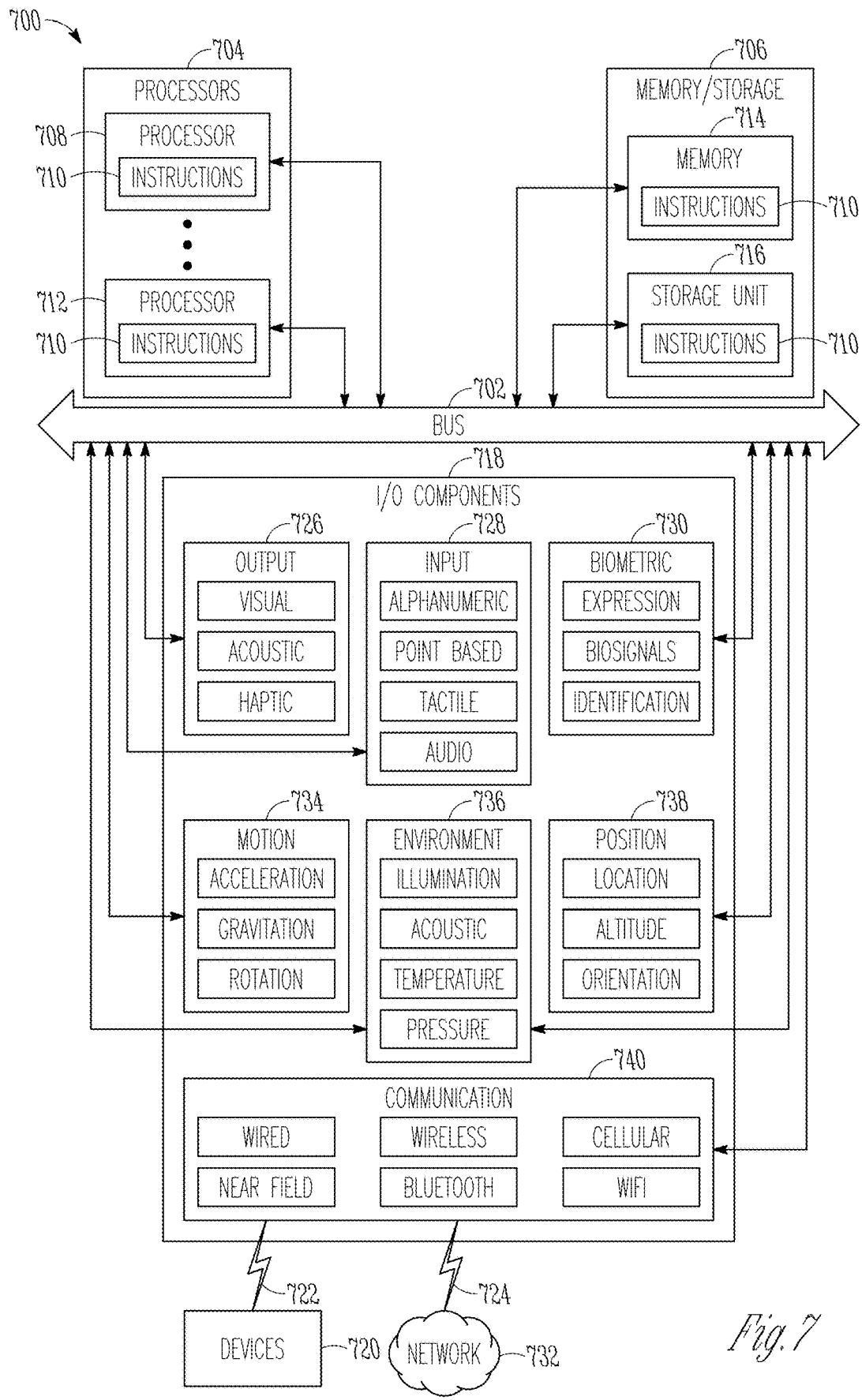

WEATHER-BASED PROJECTILE RANGE PREDICTION AND CLUB SELECTOR TOOL

CLAIM OF PRIORITY

This patent application claims the benefit of priority, under 35 U.S.C. Section 119 (e), to Johnson, U.S. Provisional Patent Application Ser. No. 63/508,821, entitled "WEATHER-BASED PROJECTILE RANGE PREDICTION AND CLUB SELECTOR TOOL," filed on Jun. 16, 2023, which is hereby incorporated by reference herein in its entirety.

TECHNICAL FIELD

This application relates to a weather-based projectile range prediction and club selector tool that, in some examples, uses weather-related training data and range prediction to assist a golfer in making a club selection based on current weather conditions.

BACKGROUND

In many sports, objects are projected through the air to reach an intended position to gain a score or to reach a desired position underway to scoring. Success depends on the sportsperson's skill and ability, as well as the way the prevailing environmental conditions influence the projected object's flight. Unfortunately, atmospheric effects on an object's flight path can be complex and not easy to understand.

Projectile flight may be affected by weather conditions. Weather conditions can depend on several factors including wind direction and strength, temperature, air density, relative humidity, and air pressure. A sportsperson, such as a golfer, is therefore challenged to understand these factors, particularly in real time, and can find it very hard to relate projectile flight to the different factors that together make up prevailing weather conditions. Making a club selection for the next stroke in a golf round can be very difficult, accordingly.

SUMMARY

The unpredictability of weather conditions poses a significant challenge in outdoor sports, particularly in golf, where the performance can be heavily influenced by environmental factors. Traditional methods of selecting golf clubs do not account for real-time weather variations, often leading to suboptimal gameplay and increased frustration among players. This lack of precision in club selection can significantly affect a player's performance, especially in professional settings where stakes are high.

Current technologies in golf equipment have primarily focused on improving the physical characteristics of the clubs and balls themselves, such as materials and acrodynamic designs. However, these advancements do not provide solutions for adapting play strategies to immediate weather conditions. While some digital applications offer generic advice based on average weather data, they fail to provide personalized recommendations that consider the unique playing style and capabilities of individual golfers.

Moreover, existing systems that attempt to incorporate weather data into sports performance generally lack integration with real-time data tracking and analysis. These systems often require manual input and interpretation of weather conditions, which can be both time-consuming and prone to error. As a result, there is a significant need for an automated, intelligent system that can dynamically adjust to changing weather conditions and provide customized equipment recommendations to golfers.

The proposed system addresses these gaps by integrating sophisticated sensors, real-time weather tracking, and advanced data analytics to offer precise, personalized club selection advice. This innovative approach not only enhances the golfer's experience by reducing guesswork but also improves overall performance by aligning equipment choices with current environmental conditions.

Examples of the present disclosure seek to provide a convenient, practical way in which a sportsperson (for example, a golf player or coach) can understand, apply and predict the effects of weather in his or her sport, and more particularly in making a club selection (in the case of golf) in light of prevailing weather conditions. Other tool-assisted bat or racquet selections in other sports are possible. In one example, a handheld tool or "app" on a smart device is provided which allows a sportsperson to make an informed club selection based on a ball flight, or range, predicted by the tool or application.

As mentioned above, in many sports, objects are projected through the air to reach an intended position to gain a score or to reach a desired position underway to scoring. Success depends on the sportsperson's skill and ability, as well as the way the prevailing environmental or weather conditions influence the projected object's flight. Wind, representing movement of the air medium, also influences an object's flight. Wind speed and direction, both variable over time, location, and height, affect the flight of an object.

The principal factors affecting the flight of an object are air density and kinematic viscosity, being aerodynamic properties of the medium through which the object travels and determinants of the forces that act on the object in flight. Other factors include the translational and rotational speeds of the object, and the object's shape, mass, and surface characteristics. In the games of tennis, baseball, and golf the loss of speed through drag force and horizontal curvature of a flight path through lateral forces related to rotational motion of the ball is clearly observed and exploited by sportspersons.

The ways in which the atmosphere's conditions, like air density and wind for example, can affect an object's flight path are complex and not easy to understand. Calculating the effects of lift and drag for a given set of atmospheric conditions for an object's flight path is complex and is unique for each sportsperson's equipment. In some examples of this disclosure, these problems are addressed by providing a simple, practical way in which a sportsperson can understand, apply and predict the effects of weather in range finding and making a personalized appropriate club selection, accordingly.

In some examples, the disclosed technology can be incorporated into a range-finding computerized training aid for sportspeople. Some examples include a computerized tactical aid that a sportsperson can use at a competitive event.

The present disclosure introduces a revolutionary approach to integrating weather analytics with personalized sports performance, specifically tailored for the sport of golf. Example systems leverage real-time environmental data and individual player performance histories to provide dynamic club recommendations that are both weather-responsive and personalized. By doing so, it bridges the gap between static sporting equipment and the dynamic nature of outdoor sports environments.

In one aspect of the invention, the system includes a comprehensive player characterization phase where detailed data about a player's performance with each club in their set is collected under various weather conditions. This data collection is facilitated by advanced tracking technologies such as launch monitors and ball-tracking radars, which capture critical performance metrics like ball launch speed, spin rate, and carry distance. This phase is crucial for building a robust model that understands how different weather conditions affect the player's shots with each club.

Following the data collection, the system enters a data normalization phase where the collected data is adjusted against standardized weather conditions to normalize performance metrics. This normalization allows for the accurate prediction of player performance under varied environmental conditions, providing a solid foundation for making real-time club recommendations during play.

During actual gameplay, example systems continuously accesses up-to-date weather data and uses the normalized player performance profiles to predict the outcomes of potential shots with different clubs. By comparing these predictions with the actual course conditions and the specific requirements of each shot, the system can recommend the optimal club for each shot in real-time. This process not only considers the distance to the target but also factors in the wind speed, direction, air pressure, and other relevant weather conditions.

Additionally, example systems are designed to be user-friendly, offering its recommendations through an intuitive interface on a smart device. This ensures that golfers can easily access and understand the advice provided, allowing them to make informed decisions quickly and improve their overall game strategy under varying weather conditions.

In some examples, a system for providing a weather-based golf club recommendation for a player is provided. An example system includes processors; and a memory storing instructions that, when executed by at least one processor among the processors, cause the system to perform operations comprising: in a player characterization phase: capturing test player performance data for a series of test shots using a golf club in a set of golf clubs, the test player performance data including at least a test distance achieved in each test shot in the series of respective test shots; obtaining test weather data pertaining to local weather conditions prevailing at a time at which the test shots were made; and associating or mapping the test player performance data with the obtained test weather data to generate weather-based performance correlations for each golf club in the set of golf clubs; in a data normalization phase: normalizing the test player performance data against standard weather conditions for a region in which the test player performance data was captured to generate normalized player performance data; and storing the test player performance data and the normalized player performance data in a database; in a competition or play phase: accessing on-course weather data at a time and for a region of the competition or play; accessing the test player performance data and/or the normalized player performance data stored in the database; and accessing course data including an on-course distance from a player's position to a target or hole for an upcoming shot in the competition or play; in a club recommendation phase: based on the accessed on-course weather data, the accessed test player performance data and/or the normalized player performance data, determining a predicted distance or range achievable by at least one club in the set of clubs for the upcoming shot; comparing the predicted distance or range against the accessed on-course distance to generate a comparison; based on the comparison, generating a weather-related, player-personalized club recommendation for the upcoming shot; and displaying, or causing a presentation of, the weather-related, player-personalized club recommendation in a screen of an electronic device.

In some examples, the test player performance data is captured by a launch monitor and/or a ball-tracking radar.

In some examples, the test player performance data further includes at least ball launch speed, spin rate, vertical launch angle, and ball carry distance.

In some examples, generating the normalized player performance data in the data normalization phase includes use of a ball flight physics model based on aerodynamic lift and drag coefficients and/or a ball-roll or ball-spin model.

In some examples, the player characterization phase includes capturing test player performance data for a series of respective test shots using each golf club in the set of golf clubs.

In some examples, the on-course distance from the player's position to the target or hole for the upcoming shot is based on distance data derived by the player and accessed by the system.

In some examples, a method for making a weather-based golf club recommendation for a player is provided. An example method includes, in a player characterization phase, for each golf club in set of golf clubs: capturing test player performance data for a series of respective test shots using each golf club in the set of golf clubs, the test player performance data including at least a test distance achieved in each test shot in the series of respective test shots; obtaining test weather data pertaining to local weather conditions prevailing at a time at which the test shots were made; and associating or mapping the test player performance data with the obtained test weather data to generate weather-based performance correlations for each golf club in the set of golf clubs; in a data normalization phase: normalizing the test player performance data against standard weather conditions for a region in which the test player performance data was captured to generate normalized player performance data; and storing the test player performance data and the normalized player performance data in a database; in a competition or play phase: accessing on-course weather data at a time and for a region of the competition or play; accessing the test player performance data and/or the normalized player performance data stored in the database; and accessing course data including an on-course distance to a target or hole for an upcoming shot in the competition or play; in a club recommendation phase: based on the accessed on-course weather data, the accessed test player performance data and/or the normalized player performance data, determining a predicted distance or range achievable by at least one club in the set of clubs for the upcoming shot; comparing the predicted distance or range against the accessed on-course distance to generate a comparison; based on the comparison, generating a weather-related, player-personalized club recommendation for the upcoming shot; and displaying, or causing a presentation of, the weather-related, player-personalized club recommendation in a screen of an electronic device.

In some examples, the test player performance data is captured by a launch monitor and/or a ball-tracking radar.

In some examples, the test player performance data further includes at least ball launch speed, spin rate, vertical launch angle, and ball carry distance.

In some examples, generating the normalized player performance data in the data normalization phase includes use of a ball flight physics model based on aerodynamic lift and drag coefficients and/or a ball-roll or ball-spin model.

In some examples, the player characterization phase includes capturing test player performance data for a series of respective test shots using each golf club in the set of golf clubs.

In some examples, the on-course distance from the player's position to the target or hole for the upcoming shot is based on distance data derived by the player.

In some examples, a machine-readable medium comprising instructions that, when read by a machine, cause the machine to perform operations comprising, at least: in a player characterization phase: capturing test player performance data for a series of test shots using a golf club in a set of golf clubs, the test player performance data including at least a test distance achieved in each test shot in the series of respective test shots; obtaining test weather data pertaining to local weather conditions prevailing at a time at which the test shots were made; and associating or mapping the test player performance data with the obtained test weather data to generate weather-based performance correlations for each golf club in the set of golf clubs; in a data normalization phase: normalizing the test player performance data against standard weather conditions for a region in which the test player performance data was captured to generate normalized player performance data; and storing the test player performance data and the normalized player performance data in a database; in a competition or play phase: accessing on-course weather data at a time and for a region of the competition or play; accessing the test player performance data and/or the normalized player performance data stored in the database; and accessing course data including an on-course distance from a player's position to a target or hole for an upcoming shot in the competition or play; in a club recommendation phase: based on the accessed on-course weather data, the accessed test player performance data and/or the normalized player performance data, determining a predicted distance or range achievable by at least one club in the set of clubs for the upcoming shot; comparing the predicted distance or range against the accessed on-course distance to generate a comparison; based on the comparison, generating a weather-related, player-personalized club recommendation for the upcoming shot; and displaying, or causing a presentation of, the weather-related, player-personalized club recommendation in a screen of an electronic device.

In some examples, the test player performance data is captured by a launch monitor and/or a ball-tracking radar.

In some examples, the test player performance data further includes at least ball launch speed, spin rate, vertical launch angle, and ball carry distance.

In some examples, generating the normalized player performance data in the data normalization phase includes use of a ball flight physics model based on aerodynamic lift and drag coefficients and/or a ball-roll or ball-spin model.

In some examples, the player characterization phase includes capturing test player performance data for a series of respective test shots using each golf club in the set of golf clubs.

In some examples, the on-course distance from the player's position to the target or hole for the upcoming shot is based on distance data derived by the player.

BRIEF DESCRIPTION OF THE DRAWINGS

FIG. 7 is a block diagram illustrating components of a machine, according to some example embodiments, able to read instructions from a machine-readable medium (e.g., a machine-readable storage medium) and perform any one or more of the methodologies discussed herein.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
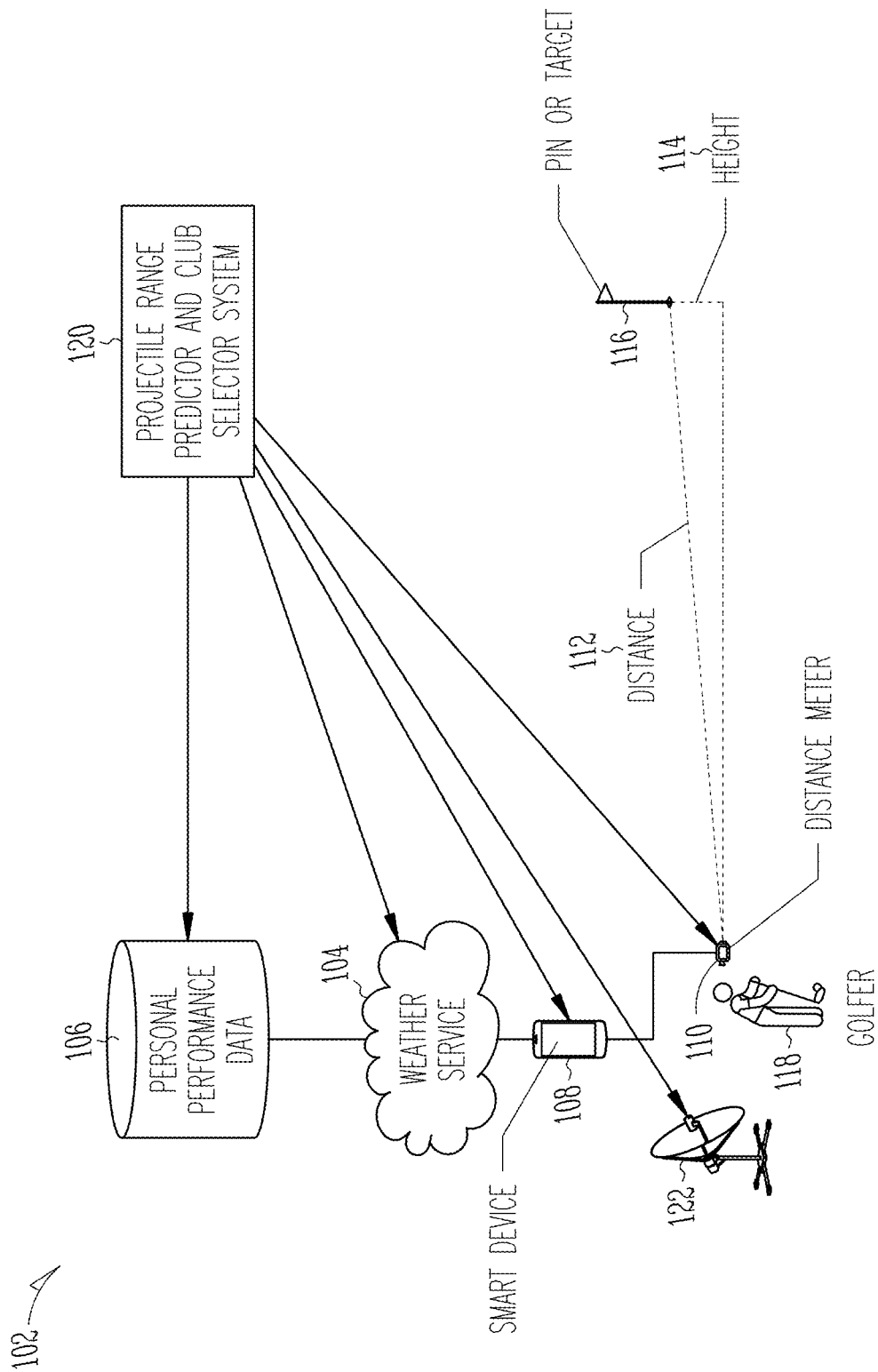
FIG. 1 is a schematic view of components and environment for training and using a range prediction and club selection system in relation to a moving object or projectile, in accordance with example embodiments.

FIG. 1 is a schematic view of components and an environment 102 for training and using a projectile range prediction and club selection system 120 in accordance with example embodiments. Although examples of the present subject matter are discussed in relation to sports activities (i.e., sports objects and projectiles, and in the context of the sport of golf), it will be appreciated that other applications are possible.

The example system environment 102 includes weather and environmental sensing components. The weather and environmental sensing components may include a weather service 104. The weather service 104 may be a cloud-based service and include equipment or a service that provides local weather conditions, including wind speed, wind direction, atmospheric pressure, temperature, and relative humidity. The weather service 104 may include components such as air temperature, pressure and humidity meters, a barometer, an anemometer and wind direction meters, and accessible values associated with current and predicted weather and/or environmental conditions. The example system environment 102 also includes data storage components, such as a personal performance database 106 storing personal performance data. The example system environment 102 also includes data processing components, such as a smart device 108. Other data processing devices such as computers and servers (not shown) are possible. The system environment 102 may include projectile tracking components 122 for tracking a sports object such as a golf ball struck by a golfer 118 during testing and in play, as described further below. The projectile tracking components 122 may be associated with or exchange data with the data storage (e.g., the personal performance database 106) and/or the data processing components (e.g., the smart device 108 and/or other processing servers, as described further below) of the system environment 102. The projectile tracking components 122 may include devices such as radar guns, doppler sensors, and boresight antennae.

The system environment 102 also includes range finding components, such as a distance meter 110 that can measure aspects such as distance 112 and height 114 to a remote pin or target 116. Other range finding aspects are possible. The projectile range prediction and club selection system 120 is communicatively coupled to the weather service 104, the personal performance database 106, the smart device 108, the distance meter 110, and the projectile tracking components 122. A user, such as the golfer 118 and/or coach, interact with the system environment 102 and the projectile range predictor and club selector system 120 in the manner described below.

Figure 2:
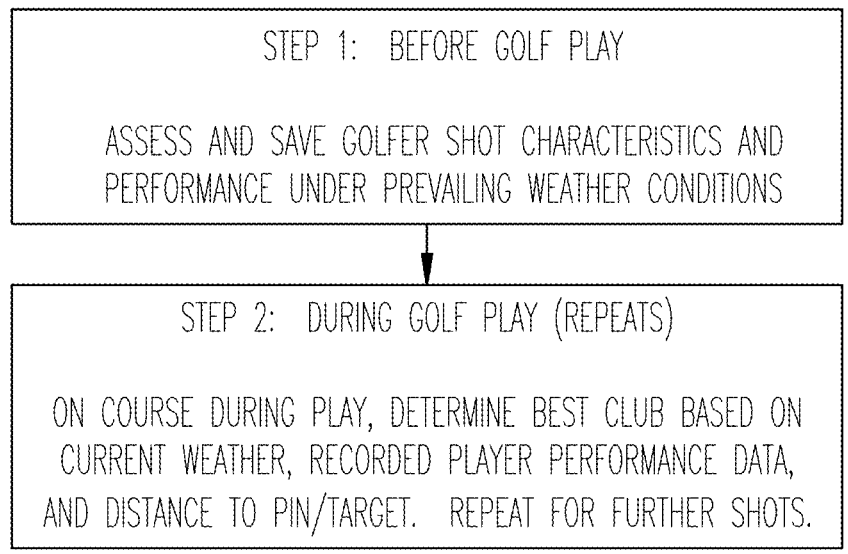
FIG. 2 is a flow chart depicting example broad operations in a method of projectile range prediction and club selection, in accordance with an example embodiment.

FIG. 2 is a flow chart broadly depicting example operations in a method of projectile range prediction and club selection in accordance with an example embodiment. These operations may be performed iteratively, or successively, by the projectile range prediction and club selection system 120. In some examples, Step 1 is performed in a test phase before a player (such as the golfer 118) plays a golf round. Step 1 includes assessing and saving golfer shot characteristics and performance under weather conditions prevailing at the time Step 1 is performed. The weather conditions may be different to the weather conditions of Step 2 performed in play and described further below. Step 1 may in some examples be seen as a training step and is performed successively to build up a training data set. The training data set includes test data relating to test golf shots performed by the user (e.g., the golfer 118) using a variety of golf clubs with which the golfing shots are made in Step 1. The variety of golf clubs tested by the golfer 118 may include one or more (typically all) of the golf clubs in the user's golf bag, and at least those clubs the golfer 118 intends to use in competition. The variety of golf clubs tested in Step 1 may include test clubs offered by a golf shop or course pro, for example.

The training data set is stored in the personal performance database 106. The stored personal performance data may relate to golf shot characteristics of one or more golfers, such as the golfer 118, in specific weather conditions prevailing at the time of Step 1 (and/or repeats thereof in the same or a different session) and in relation to a variety of golf clubs with which the golfing shots are made in Step 1. Data relating to the prevailing weather conditions is provided by the weather service 104. Golfing shot characteristics and performance may be provided by the projectile tracking components 122 and/or distance meter 100, measuring aspects such as distance and height for each shot in relation to a given pin or target 116.

In some examples, Step 2 is performed during golf play (e.g., during a competition) and may be repeated for each golf shot in a given formal round of golf for example. During play, and in response to a golfer 118 query made via the smart device 108 for example, the projectile range prediction and club selection system 120 can make a "best" club selection, based on several factors. The factors include the personal performance data previously recorded and stored in the personal performance database 106, the current (and likely different) weather conditions prevailing at the time Step 2 is performed, and a distance and/or height to the pin or target 116 at a given hole during play, for example. Data relating to the potentially different current weather conditions prevailing at the time Step 2 is performed is provided by the weather service 104. Data relating to the distance and/or height to the pin or target 116 during play is provided by the distance meter 110. The factors may also include projectile tracking data sourced from the projectile tracking components 122 during a test shot in Step 1 and/or a competition golf shot made in a prior Step 2 during play or the competition, for example. Collection of training data may be ongoing, or performed in near real-time, in some examples.

Figure 3:
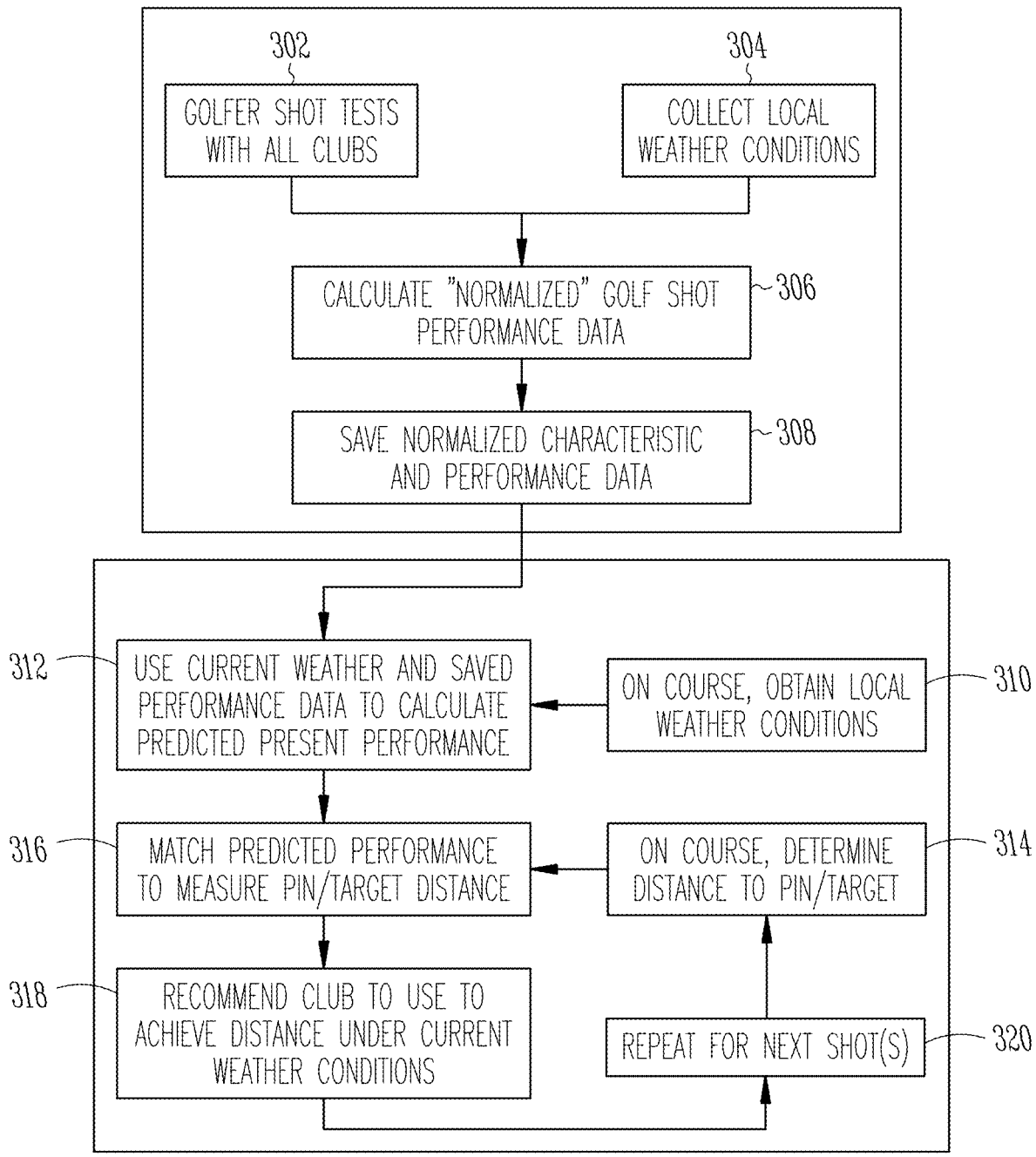
FIG. 3 is a flow chart depicting more detailed operations in a method of projectile range prediction and club selection, in accordance with an example embodiment.

FIG. 3 is a flow chart depicting some specific operations, or sub-steps, of Step 1 and Step 2, in a method of projectile range prediction and club selection, in accordance with example embodiments.

In Step 1, player performance characterization is performed. In operation 302, a golfer 118 makes test golf shots using all clubs, or a subset thereof as described above. Using data provided by the projectile tracking components 122 and the distance meter 110 for each test shot, the projectile range prediction and club selection system 120 tabulates, curates and stores a golf player's test golf shot data for each of his clubs, measured in known (assessed) weather conditions. The test golf shot data may also be referred to as "typical" golf shot data i.e., gives an informed picture (data) of how a golfer "usually" performs in given weather conditions i.e., the weather conditions assessed in Step 1. The test (or typical) shot data includes at least ball launch speed, spin rate, vertical launch angle, and ball carry distance using data derived from projectile tracking components 122 and associated devices such as launch monitors and ball-tracking radars. Data derived from the distance meter 110 may also be used in operation 302.

In operation 304, data relating to local weather conditions prevailing at the time of operation 302 is obtained and communicated to the projectile range prediction and club selection system 120 for further processing such as test shot data curation, prediction training, and normalizing.

In operation 306, the projectile range prediction and club selection system 120 calculates normalized golf shot performance data. In some examples, the projectile range prediction and club selection system 120 "normalizes" the player's shot data to "standard" weather conditions using, for example, a ball flight physics model based on proprietary or published aerodynamic lift and drag coefficients and/or an associated ball-roll or ball-spin model.

In operation 308, the measured and normalized player performance data for one or more players (such as the golfer 118) is stored in the player performance database 106 for future use, for example in Step 2 described further below.

The operations of Step 2 move from the test phase of Step 1 into a "real play" or "on course" phase, for example during a golf competition. The operations of Step 2 may be repeated by the projectile range prediction and club selection system 120 for each golf shot made in play.

In operation 310, the on course, local weather conditions (i.e., current weather data prevailing at the time of Step 2, or repeats thereof) are obtained.

In operation 312, the projectile range prediction and club selection system 120 uses the current weather data and stored normalized player performance data to calculate a predicted shot performance for each golf club during play. In some examples, a predicted shot performance includes a predicted distance indication, for example 182 yards, for an upcoming shot. Other examples and shot predictions in combination or determined separately to operation 312 are possible, for example as discussed below in operation 316.

Some examples do not include operation 312, and instead make a shot prediction in operation 316 described further below.

In operation 314, an actual "on course" distance to a pin (such as a flag in a green) or a target (such as a fairway, or a bunker or tree adjacent a golf hole) is determined. The distance data may be determined and provided by the distance meter 110. The distance meter 110 may include a laser or similar distance measuring device further able to determine the "slope" (based on horizontal distance and vertical height difference) from the golfer's position to the pin or target on course.

In operation 316, the projectile range prediction and club selection system 120 compares or matches the actual measured distance and/or slope established in operation 314 to the predicted shot performance established in operation 312. The projectile range prediction and club selection system 120 calculates a predicted carry distance for the golfer 118 for each club adjusted for the current, prevailing weather conditions and, either, the weather conditions that existed when a corresponding test shot performance was recorded in Step 1, or the "standard" weather conditions to which the player's data has been "normalized", as described above.

In some examples, the projectile range prediction and club selection system 120 receives a user entry (for example made by the golfer 118 via the smart device 108) or a direct electronic receipt (for example from the distance meter 110, or based on a location of the smart device 108) of a determined distance to the pin or target 116 on course. The distance to the pin or target 116 may be taken from the player's position and determined by a laser rangefinder, or another suitable device.

In operation 318, the projectile range prediction and club selection system 120 calculates and displays a recommended club selection to achieve the determined distance to the pin or target. The recommended club selection is made under the current weather conditions, and based on the general predicted shot performance calculated in operation 316 above.

In some examples, the projectile range prediction and club selection system 120 further receives a user entry (for example made by the golfer 118 via the smart device 108) or a direct electronic receipt (for example from the distance meter 110, or other range or slope finder) of a determined slope to the pin or target 116 on course, and determines (or adjusts) a recommendation of the "best" club to use to reach the pin or target based on the determined slope. The projectile range prediction and club selection system 120 displays the recommended club and predicted performance to the user (for example, golfer 118).

In operation 320, a repeat prediction and best club determination is made by the projectile range prediction and club selection system 120 for every following shot adapting both to changing weather conditions and the distance to the pin or target for each following shot.

Some example methods include programming a numerical processor, equipped with suitable input and output devices, with a computer program that is designed to allow entry of measured or known atmospheric values of temperature, humidity and pressure. The computer program is in addition programmed with the relevant scientific relationships to convert atmospheric values to air pressure. In addition, the computer program configures the processor to calculate the air pressure related to a specific altitude, using an appropriate scientific relationship. The computer program reads the preset stored values of the reference atmosphere and perform calculations in an iterative way to find the altitude for the reference atmosphere where the air temperature is near enough the same as the air pressure calculated for the atmosphere of interest, as specified by the input atmospheric values. This altitude (i.e. the effective altitude) is the desired result which can be output on the numerical processor's output device.

In some examples, temperature, humidity, and air pressure data can be obtained from external systems including online weather data, so that local measuring instruments are not essential. Wind speed and direction data, if desired, can also be obtained from external weather data sources. In some examples, a computer program can be adapted to include wind speed and direction, being movement of the air medium, in the calculation of an object's flight in addition to the effects of air density. While not related to atmospheric conditions, other information of potential significance to the sportsperson such as the height difference between the object's release position and the expected or desired landing position can also be input to and calculated by the computer program and provide a corresponding output.

Figure 4:
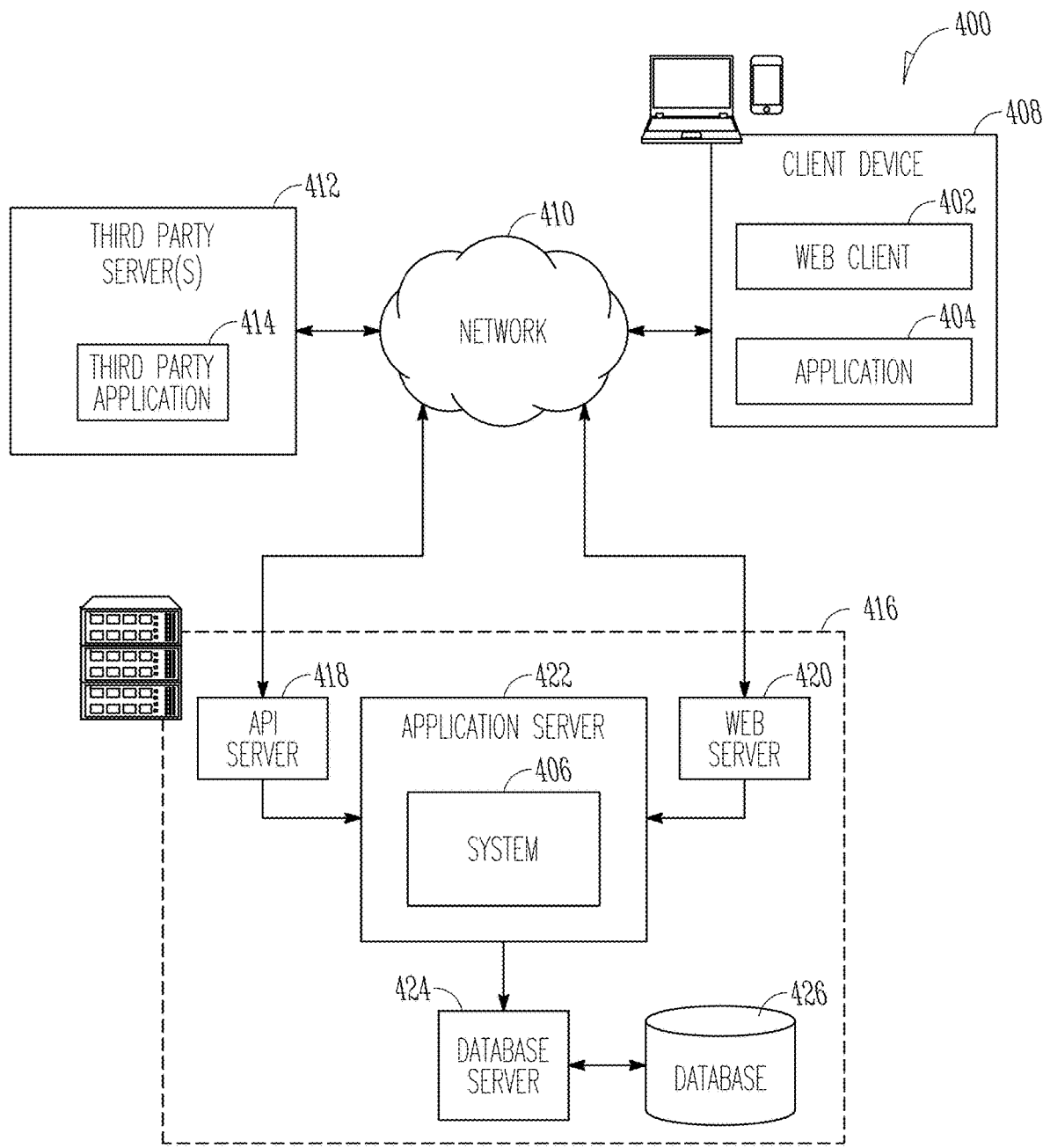
FIG. 4 is a block diagram illustrating a networked system, according to some example embodiments.

With reference to FIG. 4, an example embodiment of a high-level SaaS network architecture 400 is shown. A networked system 416 provides server-side functionality via a network 410 (e.g., the Internet or wide area network (WAN)) to a client device 408. A web client 402 and a programmatic client, in the example form of an application 404 are hosted and execute on the client device 408. The networked system 416 includes and application server 422, which in turn hosts a system 406 (for example the projectile range prediction and club selection system 120 of FIG. 1) that provides a number of functions and services to the application 404 that accesses the networked system 416. The application 404 also provides a number of interfaces described herein, which present output of the test measuring, performance prediction, analysis, and club selection operations to a user (for example, the golfer 118 of FIG. 1) of the client device 408 (for example, the smart device 108 of FIG. 1). An interface for presenting such output may be included in a display of the smart device 108 of FIG. 1.

The client device 408 enables a user to access and interact with the networked system 416. For instance, the user provides input (e.g., touch screen input or alphanumeric input) to the client device 408, and the input is communicated to the networked system 416 via the network 410. In this instance, the networked system 416, in response to receiving the input from the user, communicates information back to the client device 408 via the network 410 to be presented to the user.

An Application Program Interface (API) server 418 and a web server 420 are coupled to, and provide programmatic and web interfaces respectively, to the application server 422. The application server 422 hosts a system 406, which includes components or applications. The application server 422 is, in turn, shown to be coupled to a database server 424 that facilitates access to information storage repositories (e.g., a database 426). In an example embodiment, the database 426 includes storage devices that store information accessed and generated by the system 406.

Additionally, a third-party application 414, executing on a third-party server 412, is shown as having programmatic access to the networked system 416 via the programmatic interface provided by the Application Program Interface (API) server 418. For example, the third-party application 414, using information retrieved from the networked system 416, may support one or more features or functions on a website hosted by the third-party.

Turning now specifically to the applications hosted by the client device 408, the web client 402 may access the various systems (e.g., system 406) via the web interface supported by the web server 420. Similarly, the application 404 (e.g., an "app") accesses the various services and functions provided by the system 406 via the programmatic interface provided by the Application Program Interface (API) server 418. The application 404 may, for example, an "app" executing on a client device 408, such as an iOS or Android OS application to enable user to access and input data on the networked system 416 in an off-line manner, and to perform batch-mode communications between the programmatic client application 404 and the networked system 416.

Further, while the SaaS network architecture 400 shown in FIG. 4 employs a client-server architecture, the present inventive subject matter is of course not limited to such an architecture, and could equally well find application in a distributed, or peer-to-peer, architecture system, for example. The system 406 could also be implemented as a standalone software program, which do not necessarily have networking capabilities.

Figure 5:
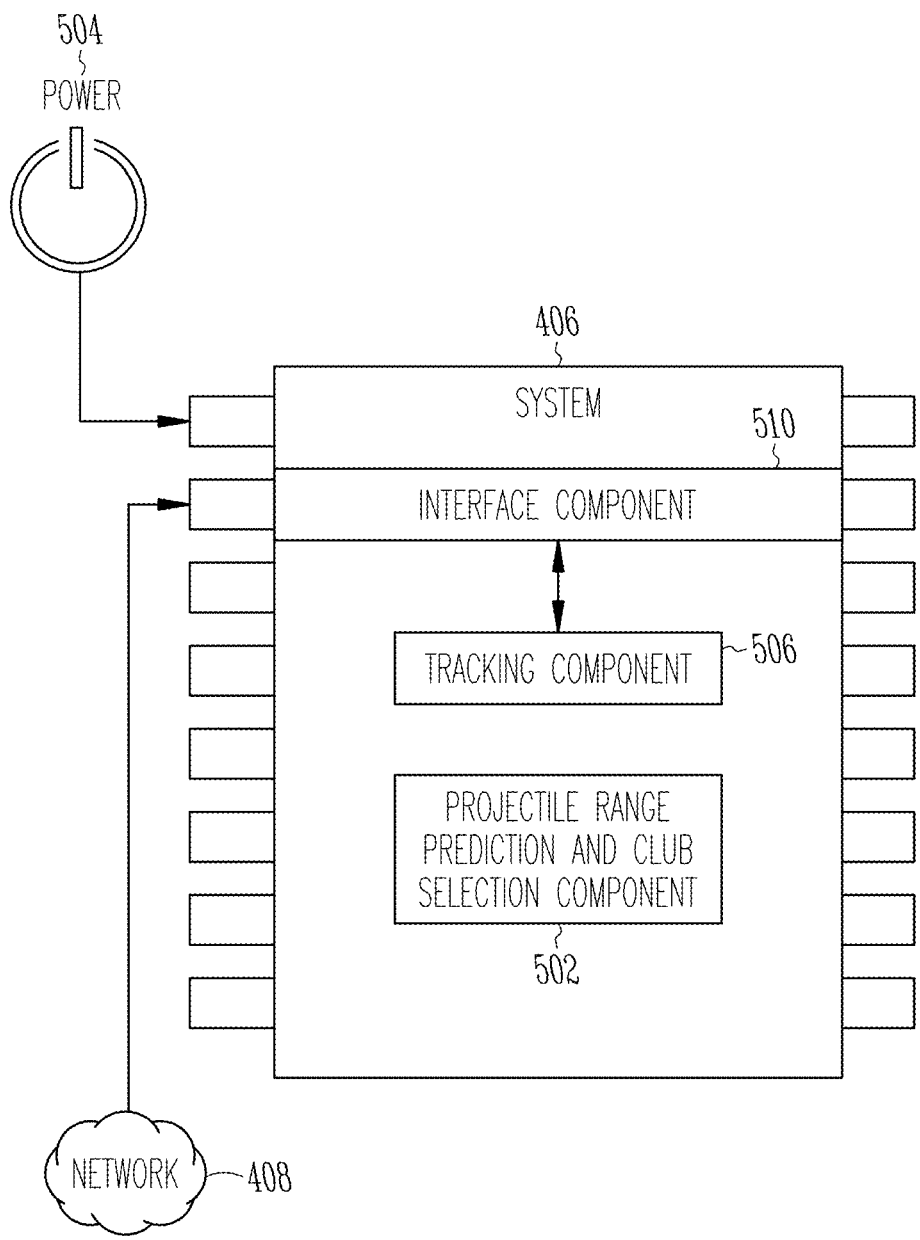
FIG. 5 is a block diagram showing some details of a system for projectile range prediction and club selection, according to some example embodiments.

FIG. 5 is a block diagram showing architectural details of a system 406, according to some example embodiments. Specifically, the system 406 is shown to include an interface component 510 by which the system 406 communicates (e.g., over the network 508) with other systems within the SaaS network architecture 400. The interface component 510 is collectively coupled to a tracking component 506 that operates to analyze a projectile's flight, and a projectile range prediction and club selection component 502 that operates to perform one or more operations of the methods described herein.

Figure 6:
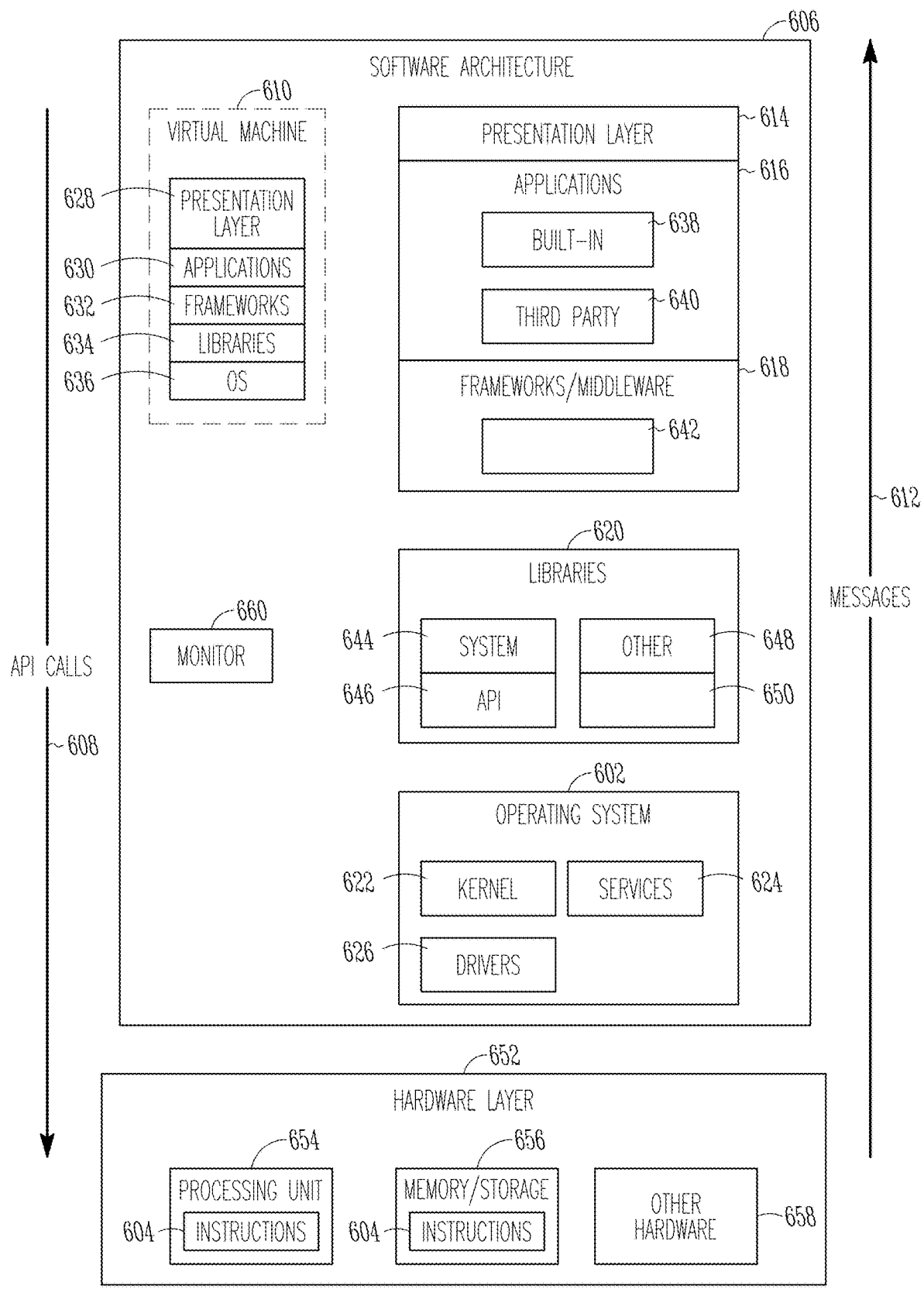
FIG. 6 is a block diagram illustrating representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive a response as in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may function as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library, and OpenCV libraries) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include any an application developed using the ANDROID™, iOS™, WINDOWS™, or other similar software development kit (SDK) by an entity other than the vendor of the particular platform and may be mobile software running on a mobile operating system such as iOS™, ANDROID™, WINDOWS® Device, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Some software architectures use virtual machines. In the example of FIG. 6, this is illustrated by a virtual machine 610. The virtual machine 610 creates a software environment where applications/components can execute as if they were executing on a hardware machine (such as the machine 700 of FIG. 7, for example). The virtual machine 610 is hosted by a host operating system (operating system (OS) 636 in FIG. 6) and typically, although not always, has a virtual machine monitor 660, which manages the operation of the virtual machine as well as the interface with the host operating system (i.e., operating system 602). A software architecture executes within the virtual machine 610 such as an operating system operating system (OS) 636, libraries 634, frameworks 632, applications 630 and/or presentation layer 628. These layers of software architecture executing within the virtual machine 610 can be the same as corresponding layers previously described or may be different.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental environment components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, wind speed and direction meters (anemometer, etc.), illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), or other components that may provide indications, measurements, or signals corresponding to a surrounding physical environment. The position components 738 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 722 and coupling 724, respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components processors communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting an NFC beacon signal that may indicate a particular location, and so forth.

The computer-based data processing systems and methods described above are for purposes of example only and may be implemented in any type of computer system or programming or processing environment, or in a computer program, alone or in conjunction with hardware. The present inventive subject matter may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the present subject matter is not limited to any specific computer language, program, or computer. It is further contemplated that the present subject matter may be run on a stand-alone computer system or may be run from a server computer system that can be accessed by a plurality of client computer systems interconnected over an intranet network, or that is accessible to clients over the Internet. In addition, many embodiments of the present subject matter have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present subject matter. It should be understood, of course, that the foregoing relates to exemplary embodiments of the invention and that modifications may be made without departing from the scope of the invention as set forth in the claims further below.

EXAMPLES

Some embodiments may include one or more of the following examples.

Example 1 includes a system for providing a weather-based golf club recommendation for a player, the system including: processors; and a memory storing instructions that, when executed by at least one processor among the processors, cause the system to perform operations comprising: in a player characterization phase: capturing test player performance data for a series of test shots using a golf club in a set of golf clubs, the test player performance data including at least a test distance achieved in each test shot in the series of respective test shots; obtaining test weather data pertaining to local weather conditions prevailing at a time at which the test shots were made; and associating or mapping the test player performance data with the obtained test weather data to generate weather-based performance correlations for each golf club in the set of golf clubs; in a data normalization phase: normalizing the test player performance data against standard weather conditions for a region in which the test player performance data was captured to generate normalized player performance data; and storing the test player performance data and the normalized player performance data in a database; in a competition or play phase: accessing on-course weather data at a time and for a region of the competition or play; accessing the test player performance data and/or the normalized player performance data stored in the database; and accessing course data including an on-course distance from a player's position to a target or hole for an upcoming shot in the competition or play; in a club recommendation phase: based on the accessed on-course weather data, the accessed test player performance data and/or the normalized player performance data, determining a predicted distance or range achievable by at least one club in the set of clubs for the upcoming shot; comparing the predicted distance or range against the accessed on-course distance to generate a comparison; based on the comparison, generating a weather-related, player-personalized club recommendation for the upcoming shot; and displaying, or causing a presentation of, the weather-related, player-personalized club recommendation in a screen of an electronic device.

Example 2 includes the subject matter of Example 1, wherein the test player performance data is captured by a launch monitor and/or a ball-tracking radar.

Example 3 includes the subject matter of Example 1 or Example 2, wherein the test player performance data further includes at least ball launch speed, spin rate, vertical launch angle, and ball carry distance.

Example 4 includes the subject matter of any one of Examples 1-3, wherein generating the normalized player performance data in the data normalization phase includes use of a ball flight physics model based on aerodynamic lift and drag coefficients and/or a ball-roll or ball-spin model.

Example 5 includes the subject matter of any one of Examples 1-4, wherein the player characterization phase includes capturing test player performance data for a series of respective test shots using each golf club in the set of golf clubs.

Example 6 includes the subject matter of any one of Examples 1-5, wherein the on-course distance from the player's position to the target or hole for the upcoming shot is based on distance data derived by the player and accessed by the system.

Example 7 includes a method for making a weather-based golf club recommendation for a player, the method including: in a player characterization phase, for each golf club in set of golf clubs: capturing test player performance data for a series of respective test shots using each golf club in the set of golf clubs, the test player performance data including at least a test distance achieved in each test shot in the series of respective test shots; obtaining test weather data pertaining to local weather conditions prevailing at a time at which the test shots were made; and associating or mapping the test player performance data with the obtained test weather data to generate weather-based performance correlations for each golf club in the set of golf clubs; in a data normalization phase: normalizing the test player performance data against standard weather conditions for a region in which the test player performance data was captured to generate normalized player performance data; and storing the test player performance data and the normalized player performance data in a database; in a competition or play phase: accessing on-course weather data at a time and for a region of the competition or play; accessing the test player performance data and/or the normalized player performance data stored in the database; and accessing course data including an on-course distance to a target or hole for an upcoming shot in the competition or play; in a club recommendation phase: based on the accessed on-course weather data, the accessed test player performance data and/or the normalized player performance data, determining a predicted distance or range achievable by at least one club in the set of clubs for the upcoming shot; comparing the predicted distance or range against the accessed on-course distance to generate a comparison; based on the comparison, generating a weather-related, player-personalized club recommendation for the upcoming shot; and displaying, or causing a presentation of, the weather-related, player-personalized club recommendation in a screen of an electronic device.

Example 8 includes the subject matter of Example 7, wherein the test player performance data is captured by a launch monitor and/or a ball-tracking radar.

Example 9 includes the subject matter of Example 7 or Example 8, wherein the test player performance data further includes at least ball launch speed, spin rate, vertical launch angle, and ball carry distance.

Example 10 includes the subject matter of any one of Examples 7-9, wherein generating the normalized player performance data in the data normalization phase includes use of a ball flight physics model based on aerodynamic lift and drag coefficients and/or a ball-roll or ball-spin model.

Example 11 includes the subject matter of any one of Examples 7-10, wherein the player characterization phase includes capturing test player performance data for a series of respective test shots using each golf club in the set of golf clubs.

Example 12 includes the subject matter of any one of Examples 7-11, wherein the on-course distance from a position of the player to the target or hole for the upcoming shot is based on distance data derived by the player.

Example 13 includes a machine-readable medium comprising instructions that, when read by a machine, cause the machine to perform operations comprising, at least: in a player characterization phase: capturing test player performance data for a series of test shots using a golf club in a set of golf clubs, the test player performance data including at least a test distance achieved in each test shot in the series of respective test shots; obtaining test weather data pertaining to local weather conditions prevailing at a time at which the test shots were made; and associating or mapping the test player performance data with the obtained test weather data to generate weather-based performance correlations for each golf club in the set of golf clubs; in a data normalization phase: normalizing the test player performance data against standard weather conditions for a region in which the test player performance data was captured to generate normalized player performance data; and storing the test player performance data and the normalized player performance data in a database; in a competition or play phase: accessing on-course weather data at a time and for a region of the competition or play; accessing the test player performance data and/or the normalized player performance data stored in the database; and accessing course data including an on-course distance from a player's position to a target or hole for an upcoming shot in the competition or play; in a club recommendation phase: based on the accessed on-course weather data, the accessed test player performance data and/or the normalized player performance data, determining a predicted distance or range achievable by at least one club in the set of clubs for the upcoming shot; comparing the predicted distance or range against the accessed on-course distance to generate a comparison; based on the comparison, generating a weather-related, player-personalized club recommendation for the upcoming shot; and displaying, or causing a presentation of, the weather-related, player-personalized club recommendation in a screen of an electronic device.

Example 14 includes the subject matter of Examples 13, wherein the test player performance data is captured by a launch monitor and/or a ball-tracking radar.

Example 15 includes the subject matter of Examples 13 or Example 14, wherein the test player performance data further includes at least ball launch speed, spin rate, vertical launch angle, and ball carry distance.

Example 16 includes the subject matter of any one of Examples 13-15, wherein generating the normalized player performance data in the data normalization phase includes use of a ball flight physics model based on aerodynamic lift and drag coefficients and/or a ball-roll or ball-spin model.

Example 17 includes the subject matter of any one of Examples 13-16, wherein the player characterization phase includes capturing test player performance data for a series of respective test shots using each golf club in the set of golf clubs.

Example 18 includes the subject matter of any one of Examples 13-17, wherein the on-course distance from the player's position to the target or hole for the upcoming shot is based on distance data derived by the player.

Some examples further include a user interface configured to display both the recommended club and an explanation of why it was chosen based on the weather conditions and player's past performance data, thereby providing the player with insights into the decision-making process.

Some examples are configured to update recommendations in real-time as weather conditions change during the course of play, ensuring that the player always has the most accurate and timely advice for club selection.

Some examples include a feedback mechanism allowing users to provide input on the accuracy and effectiveness of the club recommendations, which example systems use to further refine and improve its predictive algorithms.

Some examples are configured to integrate with existing digital golfing platforms or applications, providing a seamless user experience by incorporating club recommendations directly into a broader suite of golfing tools and services.

Some examples comprise environmental sensors integrated into the golf course or player's equipment to provide localized and precise weather data, enhancing the accuracy of the club recommendations.

Some examples utilize artificial intelligence to simulate potential outcomes of different club selections under current and forecasted weather conditions, providing a strategic planning tool for players.

Some examples are configured to provide recommendations for golf ball type and other equipment adjustments in addition to club selection, based on the weather conditions and player performance data.

Some examples include a learning component that adapts to changes in a player's performance over time, allowing the system to provide increasingly personalized and accurate recommendations as more data is collected.

Some examples are further configured to provide visualizations of expected ball trajectories and outcomes for recommended clubs under the current weather conditions, aiding players in visualizing the effects of their club choices.

Some examples are capable of operating in a low-power mode on portable devices, ensuring that it can be used throughout extended periods of play without significant battery consumption.

Example systems can offer significant technical advantages over existing solutions by utilizing a combination of real-time data acquisition, advanced analytics, and machine learning algorithms. This integration allows for a highly adaptive system that can continuously learn from each player's performance data, refining its predictions and recommendations over time. Additionally, the use of cloud-based data storage and processing ensures that the system can handle large volumes of data efficiently, providing scalability and reliability even during peak usage times.

The introduction of example weather-based golf club recommendation systems may transform the golfing industry by enhancing player performance and satisfaction. For recreational golfers, the system provides a tool that can help improve their game by making scientifically informed club choices, potentially increasing participation and enjoyment of the sport. For professional players and coaches, the system offers a competitive edge by optimizing club selection based on precise environmental and performance data. Golf equipment manufacturers and sports technology companies may also find new opportunities in partnerships and integrations with this innovative system.

Looking forward, example system architectures are designed with adaptability in mind, allowing for the integration of additional sensors and data sources. For instance, future versions could incorporate biometric data from wearable devices to further personalize recommendations based on a player's physical condition and fatigue levels. Moreover, the underlying predictive models can be adapted to other sports where environmental conditions significantly impact equipment selection and performance, such as archery, shooting, or even outdoor track and field events.

In seeking to enhance user engagement, example systems can be integrated with social features that allow players to share their performance improvements and experiences with peers. This social aspect can motivate players to engage more deeply with the sport and use the system regularly. Additionally, gamification elements such as challenges and rewards can be incorporated to make the learning and improvement process more enjoyable and rewarding.

Glossary

"CARRIER SIGNAL" in this application refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this application refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"COMMUNICATIONS NETWORK" in this application refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this application refers to a device, physical entity or logic having boundaries defined by function or subroutine calls, branch points, application program interfaces (APIs), or other technologies that provide for the partitioning or modularization of particular processing or control functions. Components may be combined via their interfaces with other components to conduct a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this application refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this application refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2022-2023, EDH US LLC, All Rights Reserved.

Although the subject matter has been described with reference to specific example embodiments, it will be evident that various modifications and changes may be made to these embodiments without departing from the broader scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A system for providing a weather-based golf club recommendation for a player, the system including:
   processors; and
   a memory storing instructions that, when executed by at least one processor among the processors, cause the system to perform operations comprising:
   in a player characterization phase:
   capturing test player performance data for a series of test shots using a golf club in a set of golf clubs, the test player performance data including at least a test distance achieved in each test shot in the series of respective test shots;
   obtaining test weather data pertaining to local weather conditions prevailing at a time at which the test shots were made; and
   associating or mapping the test player performance data with the obtained test weather data to generate weather-based performance correlations for each golf club in the set of golf clubs;
   in a data normalization phase:
   normalizing the test player performance data against standard weather conditions for a region in which the test player performance data was captured to generate normalized player performance data; and
   storing the test player performance data and the normalized player performance data in a database;
   in a competition or play phase:
   accessing on-course weather data at a time and for a region of the competition or play;
   accessing the test player performance data and/or the normalized player performance data stored in the database; and
   accessing course data including an on-course distance from a player's position to a target or hole for an upcoming shot in the competition or play;
   in a club recommendation phase:
   based on the accessed on-course weather data, the accessed test player performance data and/or the normalized player performance data, determining a predicted distance or range achievable by at least one club in the set of clubs for the upcoming shot;
   comparing the predicted distance or range against the accessed on-course distance to generate a comparison;
   based on the comparison, generating a weather-related, player-personalized club recommendation for the upcoming shot; and
   displaying, or causing a presentation of, the weather-related, player-personalized club recommendation in a screen of an electronic device.

2. The system of claim 1, wherein the test player performance data is captured by a launch monitor and/or a ball-tracking radar.

3. The system of claim 2, wherein the test player performance data further includes at least ball launch speed, spin rate, vertical launch angle, and ball carry distance.

4. The system of claim 1, wherein generating the normalized player performance data in the data normalization phase includes use of a ball flight physics model based on aerodynamic lift and drag coefficients and/or a ball-roll or ball-spin model.

5. The system of claim 1, wherein the player characterization phase includes capturing test player performance data for a series of respective test shots using each golf club in the set of golf clubs.

6. The system of claim 1, wherein the on-course distance from the player's position to the target or hole for the upcoming shot is based on distance data derived by the player and accessed by the system.

7. A method for making a weather-based golf club recommendation for a player, the method including:
   in a player characterization phase, for each golf club in set of golf clubs:
   capturing test player performance data for a series of respective test shots using each golf club in the set of golf clubs, the test player performance data including at least a test distance achieved in each test shot in the series of respective test shots;

obtaining test weather data pertaining to local weather conditions prevailing at a time at which the test shots were made; and associating or mapping the test player performance data with the obtained test weather data to generate weather-based performance correlations for each golf club in the set of golf clubs;

in a data normalization phase:

normalizing the test player performance data against standard weather conditions for a region in which the test player performance data was captured to generate normalized player performance data; and storing the test player performance data and the normalized player performance data in a database;

in a competition or play phase:

accessing on-course weather data at a time and for a region of the competition or play;

accessing the test player performance data and/or the normalized player performance data stored in the database; and accessing course data including an on-course distance to a target or hole for an upcoming shot in the competition or play;

in a club recommendation phase:

based on the accessed on-course weather data, the accessed test player performance data and/or the normalized player performance data, determining a predicted distance or range achievable by at least one club in the set of clubs for the upcoming shot;

comparing the predicted distance or range against the accessed on-course distance to generate a comparison;

based on the comparison, generating a weather-related, player-personalized club recommendation for the upcoming shot; and displaying, or causing a presentation of, the weather-related, player-personalized club recommendation in a screen of an electronic device.

8. The method of claim 7, wherein the test player performance data is captured by a launch monitor and/or a ball-tracking radar.

9. The method of claim 8, wherein the test player performance data further includes at least ball launch speed, spin rate, vertical launch angle, and ball carry distance.

10. The method of claim 7, wherein generating the normalized player performance data in the data normalization phase includes use of a ball flight physics model based on aerodynamic lift and drag coefficients and/or a ball-roll or ball-spin model.

11. The method of claim 7, wherein the player characterization phase includes capturing test player performance data for a series of respective test shots using each golf club in the set of golf clubs.

12. The method of claim 7, wherein the on-course distance from a position of the player to the target or hole for the upcoming shot is based on distance data derived by the player.

13. A non-transitory machine-readable medium comprising instructions that, when read by a machine, cause the machine to perform operations comprising, at least:

in a player characterization phase:

capturing test player performance data for a series of test shots using a golf club in a set of golf clubs, the test player performance data including at least a test distance achieved in each test shot in the series of respective test shots;

obtaining test weather data pertaining to local weather conditions prevailing at a time at which the test shots were made; and associating or mapping the test player performance data with the obtained test weather data to generate weather-based performance correlations for each golf club in the set of golf clubs;

in a data normalization phase:

normalizing the test player performance data against standard weather conditions for a region in which the test player performance data was captured to generate normalized player performance data; and storing the test player performance data and the normalized player performance data in a database;

in a competition or play phase:

accessing on-course weather data at a time and for a region of the competition or play;

accessing the test player performance data and/or the normalized player performance data stored in the database; and accessing course data including an on-course distance from a player's position to a target or hole for an upcoming shot in the competition or play;

in a club recommendation phase:

based on the accessed on-course weather data, the accessed test player performance data and/or the normalized player performance data, determining a predicted distance or range achievable by at least one club in the set of clubs for the upcoming shot;

comparing the predicted distance or range against the accessed on-course distance to generate a comparison;

based on the comparison, generating a weather-related, player-personalized club recommendation for the upcoming shot; and displaying, or causing a presentation of, the weather-related, player-personalized club recommendation in a screen of an electronic device.

14. The non-transitory machine-readable medium of claim 13, wherein the test player performance data is captured by a launch monitor and/or a ball-tracking radar.

15. The non-transitory machine-readable medium of claim 14, wherein the test player performance data further includes at least ball launch speed, spin rate, vertical launch angle, and ball carry distance.

16. The non-transitory machine-readable medium of claim 13, wherein generating the normalized player performance data in the data normalization phase includes use of a ball flight physics model based on aerodynamic lift and drag coefficients and/or a ball-roll or ball-spin model.

17. The non-transitory machine-readable medium of claim 13, wherein the player characterization phase includes capturing test player performance data for a series of respective test shots using each golf club in the set of golf clubs.

18. The non-transitory machine-readable medium of claim 13, wherein the on-course distance from the player's position to the target or hole for the upcoming shot is based on distance data derived by the player.

* * * * *